US012724906B2

(12) United States Patent
Ketharaju et al.

(10) Patent No.: US 12,724,906 B2
(45) Date of Patent: Sep. 1, 2026

(54) KEY LENGTH DISCRIMINATOR FOR RANSOMWARE ATTACKS

(71) Applicant: Wells Fargo Bank, N.A., San Francisco, CA (US)

(72) Inventors: Rameshchandra Bhaskar Ketharaju, Hyderabad (IN); Anjeet Kumar, Bengaluru (IN); Suresh Reddy, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 68 days.

(21) Appl. No.: 18/898,163

(22) Filed: Sep. 26, 2024

(65) Prior Publication Data

US 2026/0087149 A1 Mar. 26, 2026

(51) Int. Cl.
*G06F 21/60* (2013.01)
*G06F 21/55* (2013.01)

(52) U.S. Cl.
CPC .......... *G06F 21/602* (2013.01); *G06F 21/554* (2013.01)

(58) Field of Classification Search
CPC ............................ G06F 21/602; G06F 21/554
USPC .......................................................... 726/22
See application file for complete search history.

(56) References Cited

U.S. PATENT DOCUMENTS 6,959,086 B2 10/2005 Ober et al.
9,736,147 B1 8/2017 Mead
9,860,240 B2 1/2018 Webb
10,250,593 B2 4/2019 Aissi et al.
11,082,205 B2 8/2021 Bridges et al.
11,088,835 B1 8/2021 Wilbur et al.
11,671,412 B2 6/2023 Bursell et al.
11,681,783 B2 6/2023 Daly et al.
11,784,985 B2 10/2023 Graber et al.
11,895,225 B2 2/2024 Bennison
11,956,345 B2 4/2024 Hamburg et al.
2013/0044881 A1* 2/2013 Chang .................. H04L 9/0819 380/278
2016/0050066 A1 2/2016 Loizides
2017/0142082 A1 5/2017 Qian
2021/0157903 A1* 5/2021 Bursell ................. H04L 9/3239
2022/0131683 A1* 4/2022 Choi ....................... H04L 9/088
(Continued)

FOREIGN PATENT DOCUMENTS

CN 110351077 B 5/2023
CN 116192385 A 5/2023
(Continued)

OTHER PUBLICATIONS

Suresh, K. et al., "Two-factor-based RSA key generation from fingerprint biometrics and password for secure communication," Complex & Intelligent Systems (2022), Feb. 18, 2022, 15 pages.
(Continued)

*Primary Examiner* — Moeen Khan
(74) *Attorney, Agent, or Firm* — Merchant & Gould P.C.

(57) ABSTRACT

An example computer system for providing countermeasures for a ransomware attack can include: one or more processors; and non-transitory computer-readable storage media encoding instructions which, when executed by the one or more processors, causes the computer system to generate a key by to: create a salt using artificial intelligence; form a data section by the salt and an original key; and form a dummy section to fill out a length of the key.

16 Claims, 5 Drawing Sheets

(56) References Cited

U.S. PATENT DOCUMENTS

| | | | |
|---|---|---|---|
| 2023/0281286 | A1 | 9/2023 | Lindskog et al. |
| 2024/0129120 | A1 | 4/2024 | Carr |

FOREIGN PATENT DOCUMENTS

| | | | | | |
|---|---|---|---|---|---|
| CN | 114124469 | B | | 8/2023 | |
| CN | 117579374 | A | | 2/2024 | |
| CN | 114036565 | B | | 3/2024 | |
| CN | 117978365 | A | | 5/2024 | |
| CN | 118247133 | A | * | 6/2024 | ............... G06N 3/04 |
| WO | WO-2018232442 | A1 | * | 12/2018 | ........... H04L 9/0643 |

OTHER PUBLICATIONS

ITsec Bureau Quick Bytes, "Vectra AI Launches Platform to Protect Businesses From New Attack Vectors," May 7, 2024, 1 page.

Callahan, Michael, "Enabling GenAI with AI-infused API Security," Blog Post | Product, May 7, 2024, 8 pages.

Verimatrix, Verimatrix Key Shield Product Brief, "Keeping critical apps & data safe," copyright 2023, 4 pages.

* cited by examiner

112

IAM engine
202

Monitoring engine
204

Recommender engine
206

Countermeasure deployment engine
208

Salt engine
302

Key length adjuster engine
304

Key jumbler engine
306

Figure 3

KEY LENGTH DISCRIMINATOR FOR RANSOMWARE ATTACKS

BACKGROUND

A ransomware attack is an attack in which data and/or services are held hostage in exchange for compensation. Modern systems are capable of detecting such an attack to an extent; however, they provide only simplistic countermeasures for the same. Further, such systems fail to adapt to newer attack vectors or patterns over time.

SUMMARY

Examples provided herein are directed to a key length discriminator for ransomware attacks.

According to one aspect, an example computer system for providing countermeasures for a ransomware attack can include: one or more processors; and non-transitory computer-readable storage media encoding instructions which, when executed by the one or more processors, causes the computer system to generate a key by to: create a salt using artificial intelligence; form a data section by the salt and an original key; and form a dummy section to fill out a length of the key.

According to another aspect, an example method for providing countermeasures for a ransomware attack by generating a key can include: creating a salt using artificial intelligence; forming a data section by the salt and an original key; and forming a dummy section to fill out a length of the key.

The details of one or more techniques are set forth in the accompanying drawings and the description below. Other features, objects, and advantages of these techniques will be apparent from the description, drawings, and claims.

DESCRIPTION OF THE DRAWINGS

FIG. 2 shows example logical components of a server device of the system of FIG. 1.

FIG. 3 shows additional details of a countermeasure deployment engine of the server device of FIG. 2.

DETAILED DESCRIPTION

This disclosure relates to countermeasures for ransomware attacks.

The examples provided herein address the problem of ransomware attacks by providing a collection of aspects that work together to manage access, monitor anomalies, and/or deploy countermeasures.

There can be various advantages associated with the technologies described herein. For instance, the countermeasures can be developed from real-life attack scenarios and simulate attacks to identify loopholes. This allows the technologies to be prepared for unseen scenarios. Embodiments can also provide more tailored countermeasure responses and/or automatically adapt countermeasures based on an attacker's depth of access, resulting in the practical application of a safer and more robust environment.

Figure 1:
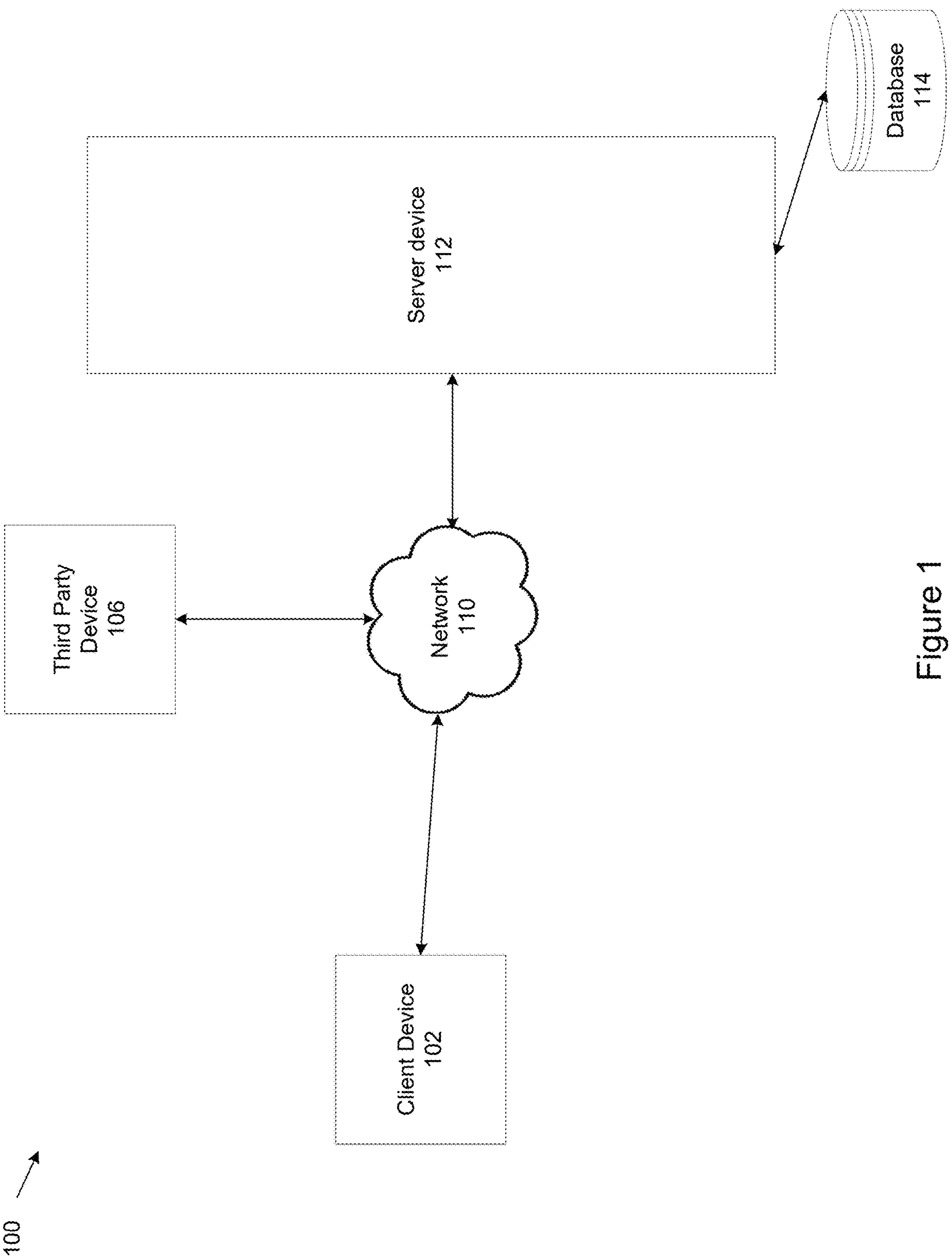
FIG. 1 shows an example system for providing countermeasures for ransomware attacks.

FIG. 1 schematically shows aspects of one example system 100 programmed to provide countermeasures for ransomware attacks. In this example, the system 100 can be a computing environment that includes a plurality of client and server devices. In this instance, the system 100 includes devices 102, 106, a server device 112, and a database 114. The devices 102, 106 can communicate with the server device 112 through a network 110 to accomplish the functionality described herein.

Each of the devices 102, 106, 112 may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The devices 102, 106 can be programmed to communicate with the server device 112 to provide financial services, although many other types of services can also be provided. As part of providing these services, the system 100 can include countermeasures for ransomware attacks. Many other configurations are possible.

The example client device 102 is programmed to communicate with the server device 112 to request data and/or services. For instance, the client device 102 can be controlled by a customer to request information associated with an account stored on the server device 112, such as a financial services account (e.g., checking or savings accounts, credit card account, etc.).

The example third party device 106 is also programmed to communicate with the server device 112 to request data and/or services. For instance, the third party device 106 can be a third-party financial institution that exchanges information with the server device 112, such as conducting financial transactions (e.g., account transfers, credit card transactions, etc.)

The example server device 112 is programmed to provide data and/or services to various clients, such as the devices 102, 106. For instance, the server device 112 can be controlled by the financial institution to provide financial services to the devices 102, 106, as described above.

The example database 114 is programmed to store data associated with the financial institution. In one example, the database 114 stores data associated with customer accounts that are serviced by the server device 112. The server device 112 can query the database 114 to obtain information associated with financial accounts and transactions.

The network 110 provides a wired and/or wireless connection between the devices 102, 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
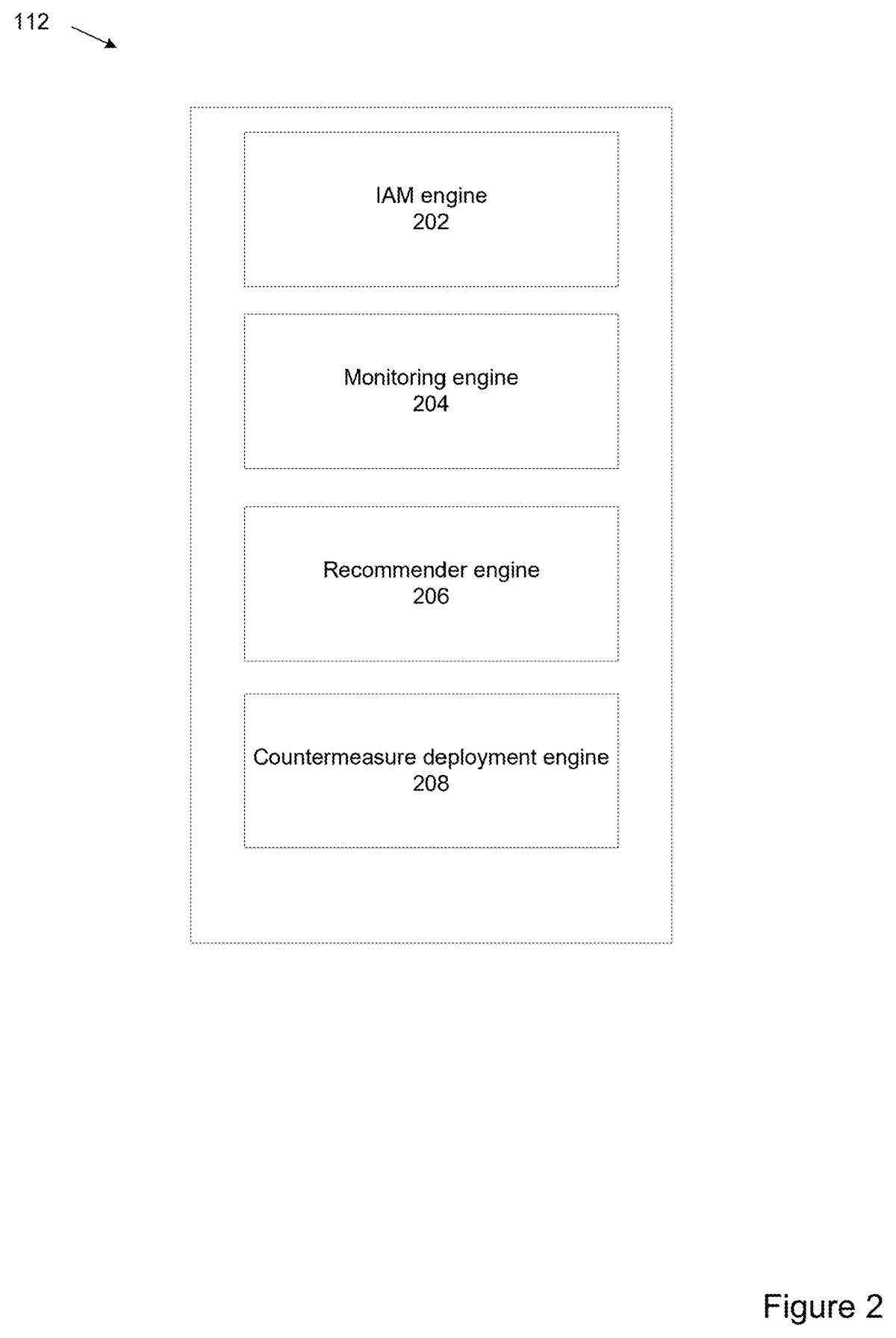

Referring now to FIG. 2, additional details of the server device 112 are shown. In this example, the server device 112 has various logical engines that assist in providing countermeasures for ransomware attacks. The server device 112 can, in this instance, include an Identity and Access Management (IAM) engine 202, a monitoring engine 204, a recommender engine 206, and a countermeasure deployment engine 208. In other examples, more or fewer engines providing different functionality can be used.

The IAM engine 202 is programmed to manage user identities and access to monitored data for the system 100.

The IAM engine 202 authenticates users based on access tokens and keys and implements a multilevel access system. If a user's profile does not match the resource access, the data is sent to the monitoring engine 204 for further action.

The example monitoring engine 204 provides real-time monitoring of the IAM engine 202, generating alerts for access requests and grants. It can use a Generative Adversarial Network for anomaly detection, learning and improving over time. Data is collected from real-life scenarios and a Sequential Simulation Generator for simulating attacks, creating a robust anomaly detection system.

The example recommender engine 206 uses generative artificial intelligence (GenAI) that analyzes anomaly profiles from generated alerts and prepares countermeasures. Based on factors, such as the number of layers bypassed and roles accessed, appropriate actions are recommended by the recommender engine 206. Countermeasures can be deployed at different levels of access as required based upon input from the recommender engine 206.

For instance, the recommender engine 206 can be trained from a corpus of previous attack data and/or simulated attack data to understand ransomware attacks. The recommender engine 206 can thereupon use GenAI to understand a current attack as information is provided by the monitoring engine 204. Based upon this information, the recommender engine 206 uses GenAI to tailor countermeasures as appropriate to address the ransomware attack, as provided in more detail below.

The example countermeasure deployment engine 208 is responsible for deploying tailored countermeasures based upon recommendations from the recommender engine 206. Various countermeasures can be used.

For instance, the countermeasure deployment engine 208 can generate a key length discriminator, which manipulates access keys within the IAM engine 202 to enhance security during a ransomware attack. Additional details of the key length discriminator are provided below.

In other examples, the countermeasure deployment engine 208 can generate other types of countermeasures in addition to or in place of the key length discriminator. For instance, the countermeasure deployment engine 208 can also be programmed to generate a software defined network (SDN) trap, leading attackers to a false clone system to enhance security. This technology can detect and flag ransomware attacks, divert attackers to false ends, learn attack patterns to improve access key protocols, and simulate attacks for internal response training. Examples of such countermeasures can be found in application Ser. No. 18/898,202, filed on even day herewith, which is hereby incorporated by reference in its entirety.

Figure 3:
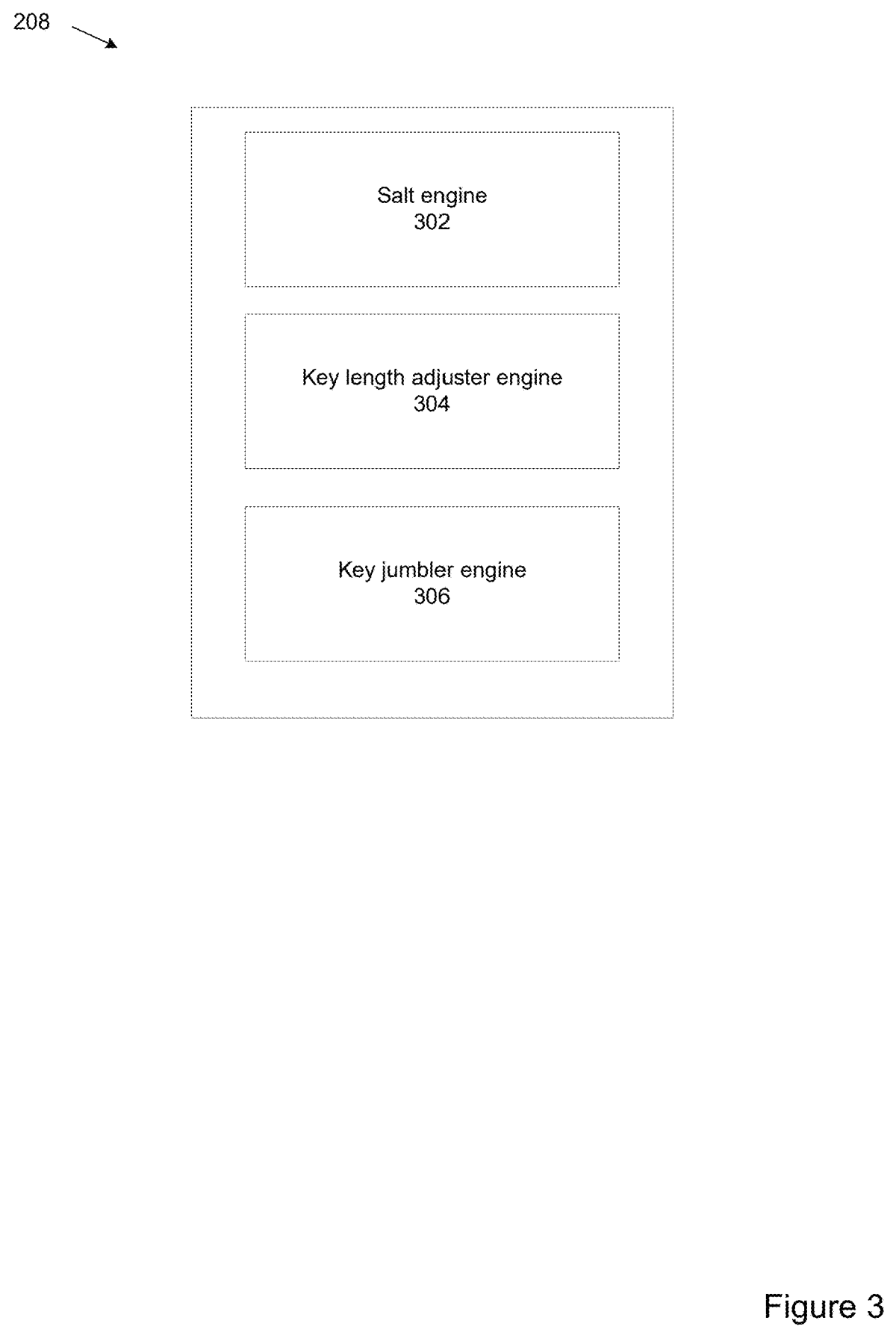

FIG. 3 shows additional details of the countermeasure deployment engine 208 of the server device 112. Generally, the countermeasure deployment engine 208 is programmed to counter potential ransomware attacks once an alert is triggered by the monitoring engine 204. The countermeasure deployment engine 208 can generate aspects of the key length discriminator, which is designed to provision cryptographic keys which are used for encryption and access of data. The keys can be created by manipulation of regular keys in a manner that works to subvert usual cryptographic attack vectors.

More specifically, the key length discriminator generated by the countermeasure deployment engine 208 can include several subsystems working together. One subsystem generates a cryptographic salt that is used in the key generation process. The length of the salt can be determined by GenAI used by the recommender engine 206. The next subsystem determines the length of the final key based on the recommendation provided by the recommender engine 206. This ensures that the key is of appropriate length for its intended purpose. Another subsystem is responsible for reordering the bits of the salt and original key within the data section of the key. This shuffling process adds an additional layer of protection to the key.

The final key is composed of three parts: the salt, the original key being manipulated, and a leftover space set to a dummy value. The combination of the salt and original key is referred to as the data section, while the remaining space is called the dummy section. The dummy section can be present on both sides of the data section, on only one side, or not present at all.

The countermeasure deployment engine 208 can therefore shift the entire data section by an arbitrary amount as provided by the recommender engine 206. This shifting adds further protection by hiding the vital data within the key, making it more difficult for attackers to identify the original key. The countermeasure deployment engine 208 can also shuffle the bits of the salt and original key within the data section based on company protocols and systems. The jumble key, which includes the original key and the salt, identifies the position of the salt within the total key length.

The benefits of the key length discriminator generated by the countermeasure deployment engine 208 lies in the manipulation of the cryptographic keys used to safeguard data. An attacker cannot differentiate between dummy values and real values, allowing even brute force to take more time. Further, even when an attacker manages to find the data section of a file, the attacker will not be able to differentiate between the various aspects of the file. Therefore, the key length discriminator makes it difficult for any attacker to figure out the original key, thus providing a strong defense against attacks.

Further, the recommended countermeasures, which can be generated by the recommender engine 206 using GenAI, are hard to predict, adding an additional layer of security. Overall, the countermeasure deployment engine 208 provides a robust defense against ransomware attacks by effectively safeguarding resources and data without disrupting the availability thereof for legitimate users.

More specifically, in this example, the countermeasure deployment engine 208 of FIG. 3 has various logical engines that assist in deploying the countermeasures. In this instance, the countermeasure deployment engine 208 includes a salt engine 302, a key length adjuster engine 304, and a key jumbler engine 306. In other examples, more or fewer engines providing different functionality can be used.

The example salt engine 302 of the countermeasure deployment engine 208 can be programmed to generate a cryptographic salt to be utilized in the key generation. The salt is random data fed as an additional input to a one-way function that hashes the data.

In the example provided, the salt engine 302 uses GenAI to randomize the salt. This can include both the length of the salt (i.e., bit length) and/or the substance of the salt. Changes to the salt length can be controlled by the recommender engine 206. For instance, depending on the type of exploit used for the ransomware attack, the recommender engine 206 can increase or decrease the length of the salt to increase or decrease protection against the ransomware attack.

Figure 4:
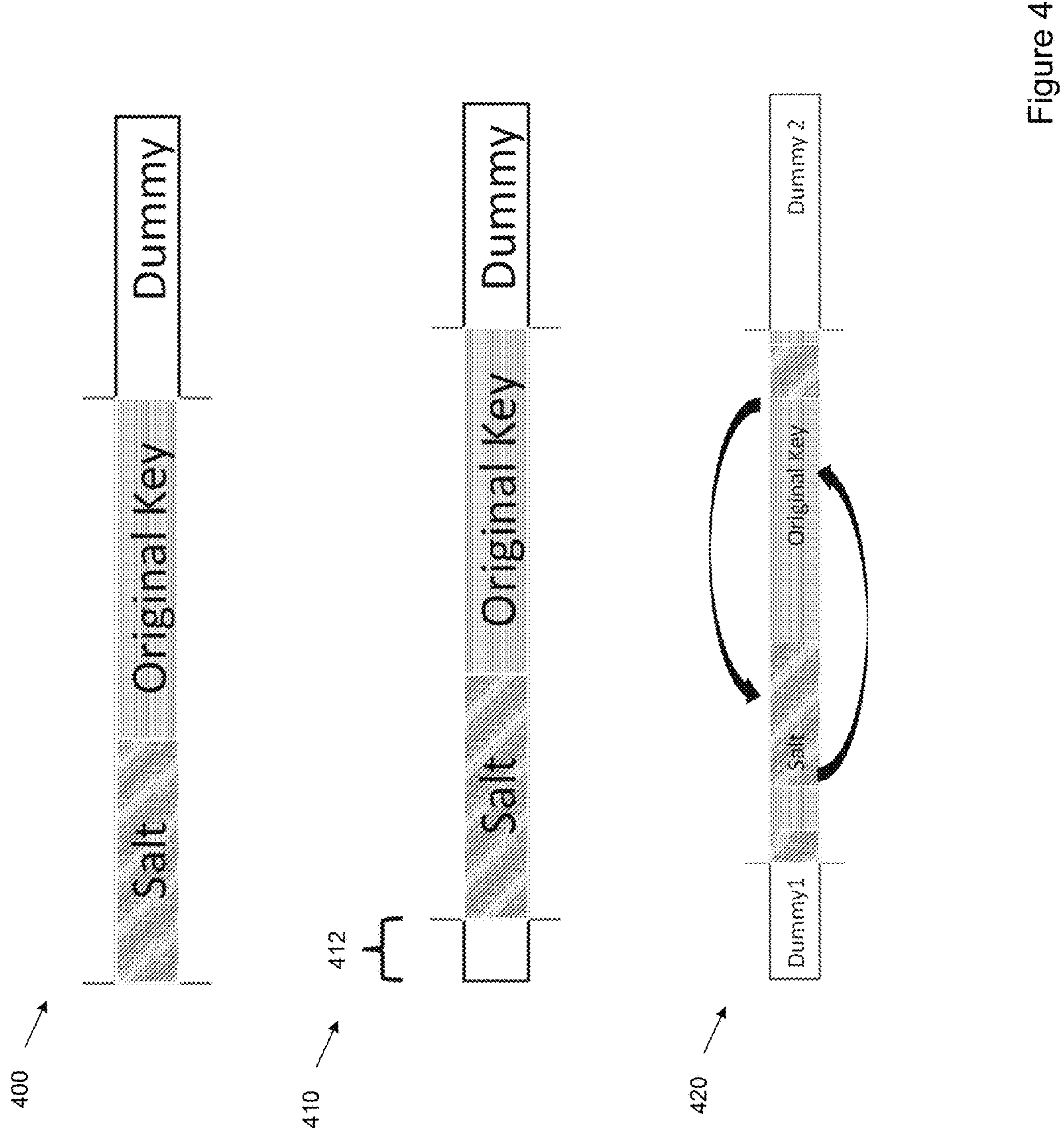
FIG. 4 shows a graphical depiction of examples keys generated by the countermeasure deployment engine of FIG. 3.

For example, FIG. 4 shows graphical depictions of examples keys 400, 410, 420 generated by the countermeasure deployment engine 208. The key 400 includes: (i) the salt (as generated by the GenAI) and an original key as the data section; and (ii) a rest of the key as the dummy section.

The dummy section in this example is simply the rest of the space that is set to a dummy value.

In one of the embodiments, the salt and original key (data section) do not have a dummy section between them. The dummy section can be on both sides of the data section, just on one side, or not present in the key at all. All three cases are possible depending on the configuration set by the countermeasure deployment engine 208 as instructed by the recommender engine 206.

Other configurations are possible. For instance, in another example, a quantum random number generator can be used to manipulate the salt in a similar manner to that described.

Referring again to FIG. 3, the example key length adjuster engine 304 is programmed to determine the length of the final key based on the recommendation by the GenAI of the recommender engine 206. This recommendation can be provided based upon a purpose for the key, as well as any specific exploit that may be present that needs to be addressed. In examples, the length can be 8 bit, 16 bit, or any other length.

The salt is generated of some length, as defined above by the salt engine 302. The data section may not be as long as the suggested final key size. Then, the key length adjuster engine 304 can shift the entire data section by an arbitrary amount as recommended by the recommender engine 206. This adds another layer of protection as the key does not contain the vital data at the beginning but is instead hidden by some variable amount.

For example, the key 410 of FIG. 4 shows the data section (including the salt and the original key) shifted by a shift amount 412. The dummy section is split between the beginning and the ending of the key 410. The shift amount 412 can be determined by the key length adjuster engine 304 using various mechanisms, such as GenAI and/or a quantum random number generator.

Referring again to FIG. 3, the example key jumbler engine 306 is programmed to manipulate the bits of the key. For instance, the key jumbler engine 306 can reorder or otherwise jumble/shuffle the bits of the data section (salt and original key). The jumbling happens based upon a recommendation by the recommender engine 206.

For instance, the key jumbler engine 306 can use GenAI to create the sequence of the jumble and generate the jumble key that includes the original key and the salt. In such an example, the jumbled key identifies the position of the salt embedded within the total key length, and the data section can be replaced with a private key. The shuffling may only take place within the data section. The new private key generated by the GenAI is shared securely, the jumbling occurs, and the new private key is required to decrypt it. This can be dynamically done to secure against ransomware type attacks.

For example, the key 420 of FIG. 4 shows portions of the salt and the original key jumbled within the data section of the key 420. A position of the data section has also been adjusted by the key length adjuster engine 304 according to a shift amount.

In the examples provided, the countermeasure deployment engine 208 can select between different countermeasures based upon input from the recommender engine 206. For instance, the countermeasure deployment engine 208 can, in one case, only adjust the salt using the salt engine 302. In other examples, the countermeasure deployment engine 208 can select between using the key length adjuster engine 304 to shift the data section and the key jumbler engine 306 to jumble the data section. In yet another example, the countermeasure deployment engine 208 can both shift and jumble.

The countermeasure deployment engine 208 can be programmed to continuously monitor countermeasure deployments and adjust security measures appropriately. For instance, the countermeasure deployment engine 208 can utilize one or more of the security measures provided by the countermeasure deployment engine 208 as described above. In conjunction with those countermeasures, the countermeasure deployment engine 208 could use other tactics, such as the SDN trap provided in application Ser. No. 18/898,202. Many other configurations are possible.

Figure 5:
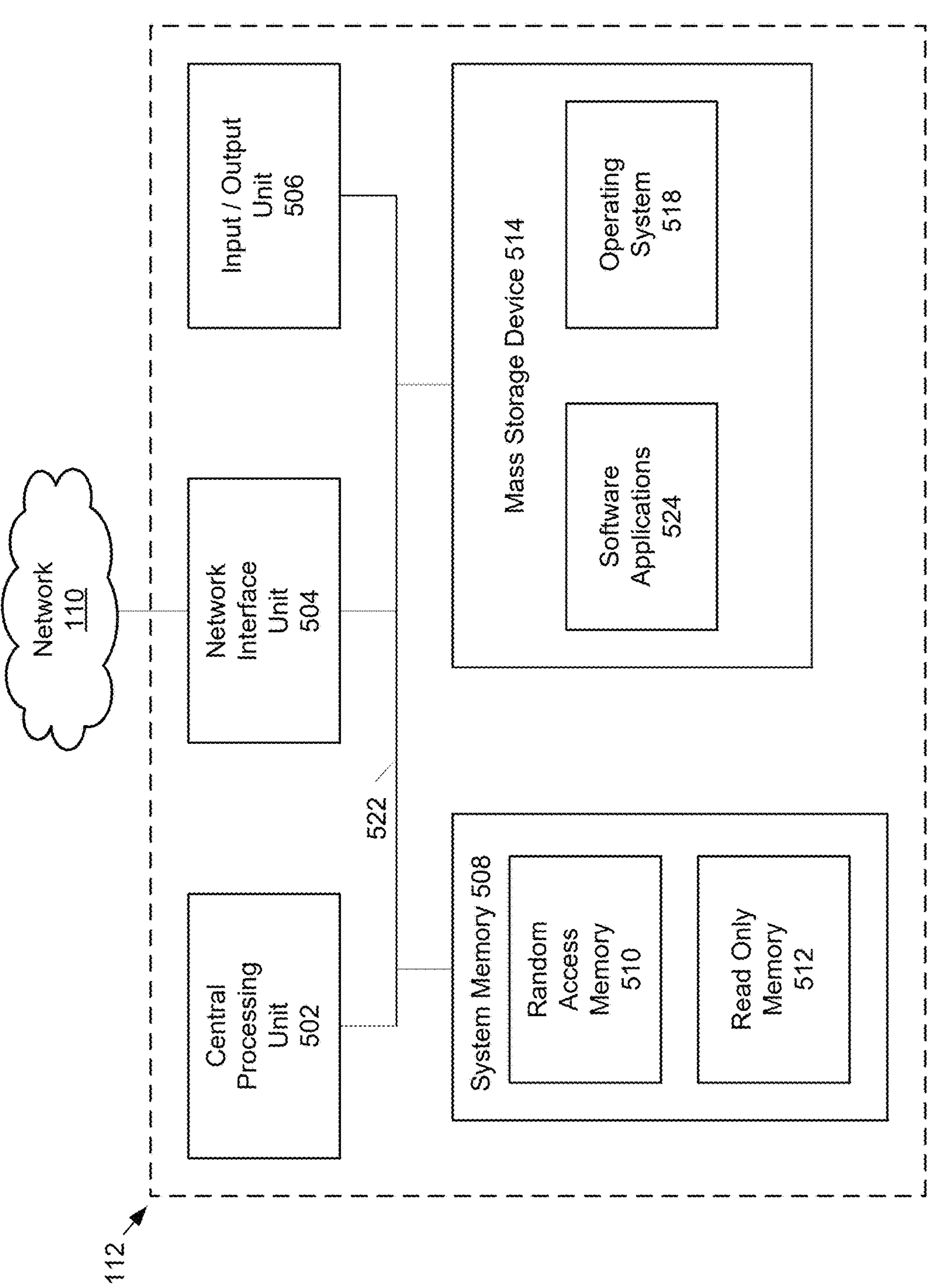
FIG. 5 shows example physical components of the server device of FIG. 2.

As illustrated in the embodiment of FIG. 5, the example server device 112, which provides some of the functionality described herein, can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the server device 112, such as during startup, is stored in the ROM 512. The server device 112 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 522. The mass storage device 514 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 504 connected to the system bus 522. It should be appreciated that the network interface unit 504 may also be utilized to connect to other types of networks and remote computing systems. The server device 112 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the server device 112 can store software instructions and data. The software instructions include an operating system 518 suitable for controlling the operation of the server device 112. The mass storage device 514 and/or the RAM 510 also store software instructions and applications 524, that when executed by the CPU 502, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for providing countermeasures for a ransomware attack, comprising:

one or more processors;

and non-transitory computer-readable storage media encoding instructions which, when executed by the one or more processors, cause the computer system, when generating a key to:

create a salt using artificial intelligence;

form, within the key, a data section by the salt and an original key;

form, within the key, a dummy section comprising leftover space set to a dummy value to fill out a length of the key; and reorder the data section of the key, wherein a portion of the salt is moved to a different position of the data section to jumble the salt and the original key.

2. The computer system of claim 1, wherein the salt is formed using generative artificial intelligence to select a salt length.

3. The computer system of claim 1, comprising further instructions which, when executed by the one or more processors, cause the computer system to shift the data section of the key so that a portion of the dummy section is at a beginning of the key.

4. The computer system of claim 1, wherein the dummy section precedes or follows the data section of the key.

5. The computer system of claim 1, wherein a first portion of the dummy section precedes the data section and a second portion of the dummy section follows the data section of the key.

6. The computer system of claim 1, comprising further instructions which, when executed by the one or more processors, cause the computer system to adjust the length of the key.

7. The computer system of claim 6, wherein the length of the key can be 8 bits or 16 bits.

8. The computer system of claim 1, wherein a first portion of the dummy section precedes the data section and a second portion of the dummy section follows the data section of the key.

9. A method for providing countermeasures for a ransomware attack by generating a key, comprising:

creating a salt using artificial intelligence;

forming, within the key, a data section by the salt and an original key;

forming, within the key, a dummy section comprising leftover space set to a dummy value to fill out a length of the key; and reordering the data section of the key, wherein a portion of the salt is moved to a different position of the data section to jumble the salt and the original key.

10. The method of claim 9, wherein the salt is formed using generative artificial intelligence to select a salt length.

11. The method of claim 9, further comprising shifting the data section of the key so that a portion of the dummy section is at a beginning of the key.

12. The method of claim 9, wherein the dummy section precedes or follows the data section of the key.

13. The method of claim 9, wherein a first portion of the dummy section precedes the data section and a second portion of the dummy section follows the data section of the key.

14. The method of claim 9, further comprising adjusting the length of the key.

15. The method of claim 14, wherein the length of the key can be 8 bits or 16 bits.

16. The method of claim 9, wherein a first portion of the dummy section precedes the data section and a second portion of the dummy section follows the data section of the key.

* * * * *